US008137235B2

(12) United States Patent
Aimo Boot et al.

(10) Patent No.: US 8,137,235 B2
(45) Date of Patent: Mar. 20, 2012

(54) BRAKING METHOD AND DEVICE WITH ENERGY RECOVERY IN PARTICULAR FOR A VEHICLE EQUIPPED WITH HYBRID TRACTION SYSTEM

(75) Inventors: Marco Aimo Boot, Caselle Torinese (IT); Mauro Colombano, Occimiano (IT); Marco Imarisio, Rivalta di Torino (IT); Stefano Salio, Pino Torinese (IT)

(73) Assignee: Iveco S.p.A., Turin (IT)

( * ) Notice: Subject to any disclaimer, the term of this patent is extended or adjusted under 35 U.S.C. 154(b) by 377 days.

(21) Appl. No.: 12/471,170

(22) Filed: May 22, 2009

(65) Prior Publication Data

US 2009/0298641 A1 Dec. 3, 2009

(30) Foreign Application Priority Data

May 27, 2008 (EP) ..................................... 08156942

(51) Int. Cl.
*B60W 10/08* (2006.01)
(52) U.S. Cl. .............................................. 477/4; 701/70
(58) Field of Classification Search .................. 477/2, 4, 477/186, 187, 188, 203, 204, 205; 318/56, 318/57, 60, 86, 375, 376, 380; 180/65.21, 180/65.275, 65.31; 903/947; 701/70, 71
See application file for complete search history.

(56) References Cited

U.S. PATENT DOCUMENTS

| 5,050,936 | A | * | 9/1991 | Tanaka et al. | 303/3 |
|---|---|---|---|---|---|
| 5,839,533 | A | * | 11/1998 | Mikami et al. | 180/165 |
| 5,923,093 | A | * | 7/1999 | Tabata et al. | 290/40 C |
| 6,459,980 | B1 | * | 10/2002 | Tabata et al. | 701/70 |
| 6,691,013 | B1 | * | 2/2004 | Brown | 701/70 |
| 6,708,789 | B1 | * | 3/2004 | Albuquerque De Souza E Silva | 180/65.245 |
| 6,762,523 | B1 | * | 7/2004 | Lisowski | 310/103 |
| 7,001,306 | B2 | * | 2/2006 | Suzuki | 477/4 |
| 7,028,793 | B2 | * | 4/2006 | Hu et al. | 180/65.25 |
| 7,131,708 | B2 | * | 11/2006 | Tao et al. | 303/152 |
| 7,163,487 | B2 | * | 1/2007 | Tao et al. | 477/3 |
| 7,604,076 | B2 | * | 10/2009 | Anderson | 180/65.28 |
| 7,634,345 | B2 | * | 12/2009 | Karnjate et al. | 701/70 |
| 7,976,427 | B2 | * | 7/2011 | Yamamoto et al. | 477/4 |
| 2001/0016795 | A1 | * | 8/2001 | Bellinger | 701/53 |
| 2002/0143456 | A1 | * | 10/2002 | Grob et al. | 701/70 |
| 2005/0255965 | A1 | * | 11/2005 | Tao et al. | 477/4 |
| 2005/0255966 | A1 | * | 11/2005 | Tao et al. | 477/27 |
| 2005/0285554 | A1 | * | 12/2005 | King et al. | 318/376 |
| 2007/0299593 | A1 | * | 12/2007 | Karnjate et al. | 701/70 |
| 2009/0062060 | A1 | * | 3/2009 | Rink | 477/4 |
| 2009/0066273 | A1 | * | 3/2009 | Dunn | 318/376 |
| 2009/0118885 | A1 | * | 5/2009 | Heap et al. | 701/22 |
| 2010/0106386 | A1 | * | 4/2010 | Krasznai et al. | 701/70 |

FOREIGN PATENT DOCUMENTS

| DE | 10 2006 049 761 A1 | 4/2008 |
|---|---|---|
| EP | 0 800 494 A2 | 10/1997 |
| GB | 2 368 827 | 5/2002 |

* cited by examiner

*Primary Examiner* — John R Olszewski
*Assistant Examiner* — Brodie Follman
(74) *Attorney, Agent, or Firm* — Stetina Brunda Garred & Brucker (57) ABSTRACT

A braking method and device with energy recovery for a hybrid traction vehicle, which, according to the requested braking target, regulates the intervention of the engine-generator and the connection or disconnection of the endothermic engine from the transmission line.

8 Claims, 8 Drawing Sheets

BRAKING METHOD AND DEVICE WITH ENERGY RECOVERY IN PARTICULAR FOR A VEHICLE EQUIPPED WITH HYBRID TRACTION SYSTEM

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

The present invention relates to a braking method and device with energy recovery, in particular for a vehicle equipped with hybrid traction system.

DESCRIPTION OF THE PRIOR ART

The laws on greenhouse gases emissions impose increasingly stricter limits in terms of the efficiency of land vehicles with endothermic engine.

Vehicle equipped with hybrid traction systems are known in the art, in such vehicles the locomotion is carried out by both one or more endothermic engines and one or more electric engines. These last ones are fed by means of batteries that may be recharged by the electric engine that functions as a generator. In particular, in the concept of regenerative braking, also known in the art, the electric engine, functioning as a generator, transforms the kinetic energy of the vehicle into electric energy that is returned to the power supply.

The light, average and heavy vehicle, in particular, not only have a remarkable engine brake due to the internal friction, but may also be equipped with an additional decelerating brake more or less complex, which operates on the thermal engine or on the drive-line, for example of the type Exhaust Engine Brake, or Decompression Brake, or combined, or Intarder/Retarder: these additional systems are useful in order to not to overstrain the traditional braking systems in case of long downhill roads.

The use of an engine-generator replacing the additional brake, on the other hand, is not devoid of problems, because the stall torque provided by the engine-generator decreases as the state of charge of the battery pack increases, and therefore may be zero in case of particularly long downhill roads, that is when the batteries are fully recharged. Moreover, the systems known for the management of the battery recharging, in order to maximize the recharging, may disconnect the endothermic engine from the transmission when the accelerator is released, that will not allow to use its contribution in braking.

On the contrary, the braking action of an engine-generator, especially with dead batteries, associated to the additional brake will be too strong to the detriment of the vehicle drivability and safety.

The problem thus arises of integrating all the braking functions in order to avoid both the braking excesses and insufficiencies and to guarantee the vehicle safety and drivability. This braking functions should also be coordinated and integrated with the peculiar functions of a vehicle equipped with a hybrid traction system, such as the management of the thermal engine switching off when it does not have to provide the torque and its consequent restarting, with the vehicle stationary or moving (Stop&Start function), or the integration of the torque provided by the different thermal and electric engines during the acceleration (Boost Acceleration function).

BRIEF SUMMARY

The aim of the present invention is to provide a braking method and device that solves all the problems set forth above.

Therefore the object of the present invention is a braking method with energy recovery, in particular for a vehicle equipped with hybrid traction system and service brakes, said hybrid traction system comprising: at least a thermal engine, able to provide a first braking torque deriving from the friction and a second braking torque deriving from one or more additional braking systems, operating on the thermal engine and/or on a transmission; at least an electric engine-generator, connected to one or more battery systems able to provide a third braking torque if functioning as a generator, wherein said braking method it comprises a determination step of a braking torque overall value which considers said first, second and third braking torque, and which gives the priority to the contribution of said third braking torque for the highest energy recovery.

Preferably according to the braking method with energy recovery, said determination step of a braking torque overall value comprises: the deactivation of said thermal engine, if said electric engine-generator is able to obtain said braking torque overall value by means of said third braking torque alone; the activation of said thermal engine, if said electric engine-generator is not able to obtain said braking torque overall value by means of only said third braking torque, generating at least said first braking torque so that said braking torque overall value comprises said first and third braking torque.

Preferably according to the braking method with energy recovery, said determination step of a braking torque overall value comprises the activation of said braking additional system, operating on the thermal engine or on the transmission, so that it is able to generate also said second braking torque, so that said braking torque overall value comprises said first, second and third braking torque.

The present invention relates also to a braking device with energy recovery which embodies the method.

The present invention relates in particular to a braking method and device with energy recovery, in particular for a vehicle equipped with hybrid traction system, as described more fully in the claims, which are an integral part of this description.

BRIEF DESCRIPTION OF THE DRAWINGS

Further characteristics and advantages of the invention will be more apparent in light of a detailed description of a preferred, but non-exclusive, embodiment of a braking method and device with energy recovery, shown with the help of the drawings that are attached hereto, which are merely illustrative and not limitative, in which:

FIGS. 3.1, 3.2, 4.1, 4.2, 5.1 and 5.2 show flowcharts of the control functions of the braking method with energy recovery that is the object of the present invention for the three positions of the actuator PRES.

DETAILED DESCRIPTION

Figure 1:
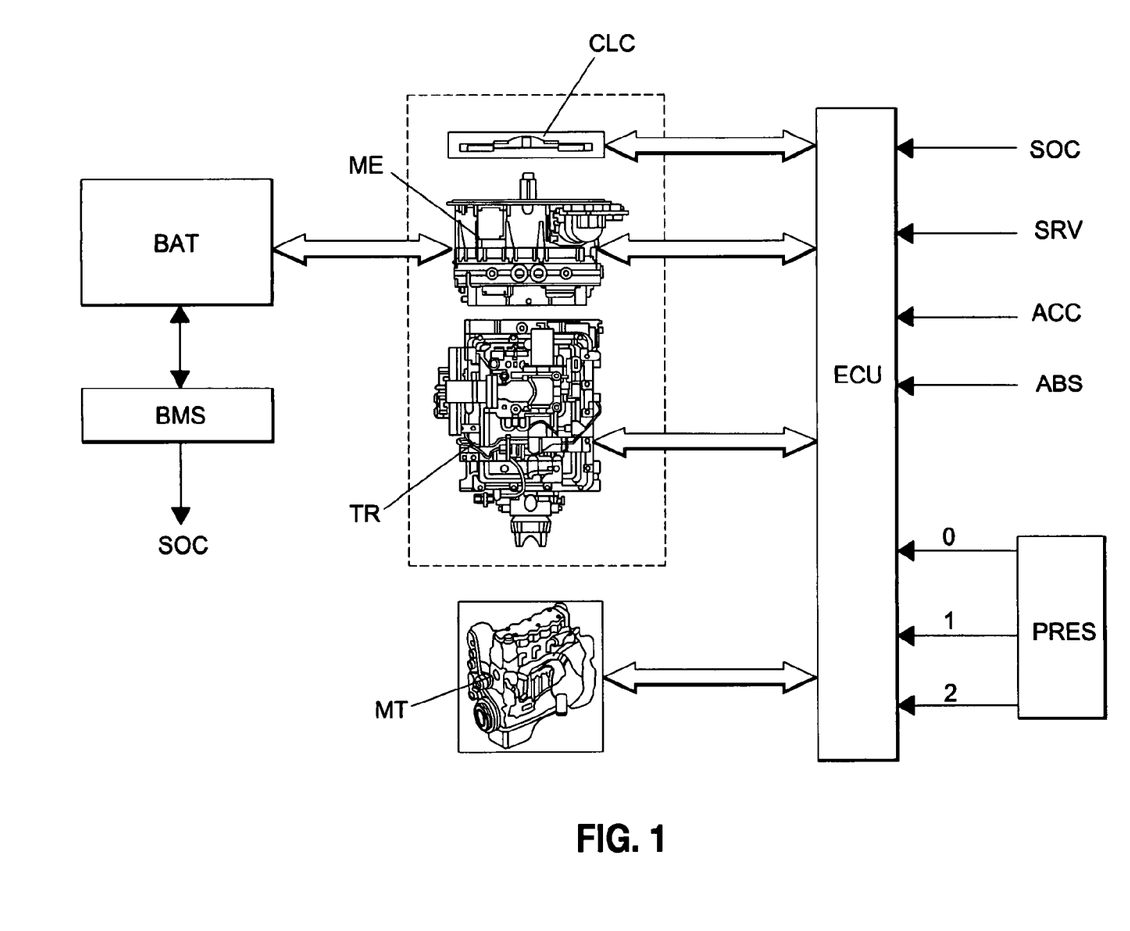
FIG. 1 shows a functional block diagram of the braking device with energy recovery that is object of the present invention.

FIG. 1 shows the functional blocks present on a vehicle which are involved in the braking system with energy recovery that is object of the present invention.

In the hybrid traction system there are elements known in the art, such as at least a thermal engine MT, a transmission block TR generally mechanical, an electric engine-generator ME, a clutch CLC possibly automatic. The electric engine-generator ME is electrically connected to an appropriate traction battery system BAT which is able to deliver electric current to ME when it functions as an engine, and, on the contrary, to absorb electric current from ME when it functions as a generator. The battery system BAT is controlled by an appropriate electronic control unit BMS which may be separate or integrated with other vehicular controllers.

The functionalites of the components mentioned above are controlled by an electronic control unit ECU which carries out the braking method with energy recovery that is object of the present invention. Moreover ECU receives further signals described below.

In the braking system with energy recovery are also involved:
  the braking system of the service brakes, possibly comprising ABS and/or ASR/ESP systems of the type known, which sends a control signal SRV to ECU indicating the activation state of the brake pedal, and a control signal ABS indicating the intervention of the ABS system;
  the additional braking system, operating on the thermal engine or on the transmission (drive-line) of the type known in the art; for example of the type Exhaust Engine Brake, or Decompression Brake, or combined, or Intarder/Retarder;
  the acceleration system, which sends a signal ACC to ECU indicating the activation state of the accelerator pedal.

It is also present a three-way actuator system PRES, for example a manual switch on the dashboard, for preselecting the following alternatives regarding the activation of the additional engine brake:
  0=additional engine brake deactivated;
  1=additional engine brake activated by the pressure on the service brake pedal;
  2=additional engine brake activated by the release of the service brake pedal;

There may be a different intervention mapping of the additional engine brake as a function of the choice of 1 or 2.

The choice among these three alternatives may be left to the driver according to his/her needs or preferences, and is merely illustrative and non limitative. Other choices are possible as a function of the available types of additional brake and of the types of actuation and preselection.

The engine-generator ME, when braking, functions as a generator, converting the kinetic energy associated to the vehicle's motion into electric energy which is in its turn recovered by means of the battery system BAT: this function is called "regenerative braking".

On the contrary, when accelerating, the electric engine-generator ME functions as an engine, providing torque used for the vehicle traction; such torque adds to that provided by the thermal engine MT, for example by carrying out the function called "Boost Acceleration".

Another peculiar function of the hybrid traction vehicle that is involved is that called "Stop&Start". In this case the thermal engine MT is switched off when the vehicle is slowing down, if the thermal engine MT does not have to provide torque for the traction or for the battery recharging; the thermal engine MT will be automatically restarted when it will have to provide torque again.

The information that the ABS is activated may be used for disabling the functionalities of the hybrid traction system and, with them, the regenerative braking function, while the action of the additional engine brake is coordinated with the activation of the regenerative braking, with the Boost Acceleration function or with the Stop&Start function.

The electronic control unit BMS associated to the battery BAT sends the information on the state of charge SOC to the electronic control unit ECU, which calculates, and sends to the engine-generator ME, the following alternative controls:
  Deactivation request of the regenerative braking
  Activation request of the regenerative braking, providing at the same time the braking torque reference.

Therefore, as regards the braking mode, the hybrid vehicle, in addition to the usual service brake system, is able to exploit three different additional sources of braking torque:
  The braking torque MTG provided by the engine-generator ME regardless of the fact that the clutch is open or close. This resistant action of the engine-generator, apart from contributing to the braking performance, is also used by the system in order to convert the kinetic energy of the vehicle into electric energy for the recharging of the traction battery.
  The braking torque EF generated by the thermal engine MT by means of the internal friction that is available only if the clutch is closed (Crankshaft Clutch State=CLOSED).
  The braking torque EB generated by action of the additional brake, if operating on the thermal engine MT, that is available only when the clutch is closed (Crankshaft Clutch State=CLOSED). The EB torque depends on the angular speed of the thermal engine MT.

From the driver's point of view, the braking contribution of the three additional sources are perceived as a single engine braking system, and therefore require appropriate integration strategies, taking into account the additional contribution provided by the engine-generator.

According to the invention, the overall braking action is carried out by the various contributions that may be added up and that may vary in time according to the different situations.

The braking torque overall value is calculated at every instant, and is a constraint: it is continually calculated on the basis of the driving conditions by the electronic control unit ECU which will try to continually actuate it, by using the available braking torque sources mentioned above, MTG, EF, EB, giving the priority to the MTG contribution of the electric engine-generator ME in order to recover energy.

This is mechanically actuated by the clutch CLC: by disconnecting the thermal engine MT from the drive-line, the electric engine ME should be able to obtain the braking torque overall value.

If, on the contrary, the electric engine ME is not able to obtain the whole braking torque overall value, but it guarantees only a part of it, then the clutch is closed and the thermal engine MT is started (if it was switched off before, according to the Stop&Start logic), but it is still not possible to enable the action of the additional engine brake. If it is not possible to reach the braking torque overall value without the relative torque EB, then the action of the additional engine brake is also activated, obtaining the sum of the three contributions.

The braking torque overall value takes also into account the mode of intervention of the additional engine brake, according to the position of the three-way actuator PRES that the user has selected.

The management logic of the additional engine brake, therefore, is such that in certain steps the vehicle may function with the thermal engine MT switched off; this may prevent the activation of the braking torques EF and EB, for this reason a particular attention is required for safety reasons. This problem is solved by the present invention.

Another problem solved by the present invention is the fact that when the battery BAT is charged, the electric brake is no longer able to contribute to the braking, because the engine-generator ME does not deliver electric current and therefore cannot convert the kinetic energy into electric energy as a generator. In these cases, other braking torque sources may intervene in a controlled way.

The service brake, of course, will be always available, even though it will be used as less as possible. It is not subject to the direct control of ECU, but is positively influenced by it, in the sense that the whole braking contribution deriving from the additional braking system serves to reduce the request to the service brake.

Calculation of the Reference Target Value of Braking Torque.

A non limitative example for the calculation of the reference target value of braking torque brought to the transmission input is hereinafter described and identified by the label "BrakeTrq_Target".

The target depends on the activation of the brake and accelerator pedal, as well as on the preselection set by the driver by means of the actuator PRES, and is the result of:

$$Brake Trq\_Target = Brake Trq\_Target\_APBP + Brake Trq\_Target\_EB$$

Wherein:
BrakeTrq_Target_APBP=initial target of braking torque associated to the release of the accelerator pedal or to the pressure on the brake pedal
BrakeTrq_Target_EB=partial target of braking torque associated to the activation request of engine brake as a function of the preselection PRES.

It is not necessary to calculate the contribution provided by the relative component of the internal friction, because does not depend on the driver's will; therefore its entity is not controllable, but depends on the vehicle thermal engine type.

The following description also refers to FIGS. 3.1, 3.2, 4.1, 4.2, 5.1 e 5.2 which show the respective flowcharts of the functions carried out, according to the three positions of the actuator PRES. The respective operations carried out, that are self-explicative, are reported in the functional blocks.

Calculation of the Contribution BrakeTrq_Target_APBP to the Reference of Braking Torque.

The calculation of the additional braking torque target in transmission output (BrakeTrq_Target_APBP_out), that has to be provided by the braking systems on the vehicle, is carried out as a function of the respective position of the accelerator and brake pedal.

If the brake pedal is pressed (signal SRV=TRUE), the braking torque reference has a predetermined value (i.e. −1200 Nm) called BrakeTrqbyBP. In such condition the torque target is:

$$Brake Trq\_Target\_APBP\_out = Brake Trq by BP$$

If the accelerator pedal is released (the position of the pedal is available by means of the signal ACC), the braking torque reference has a value between zero and a maximum value (parameter: BrakeTrqbyAPMax, i.e. −400 Nm), according to the linear trend shown in FIG. 2.

Figure 2:
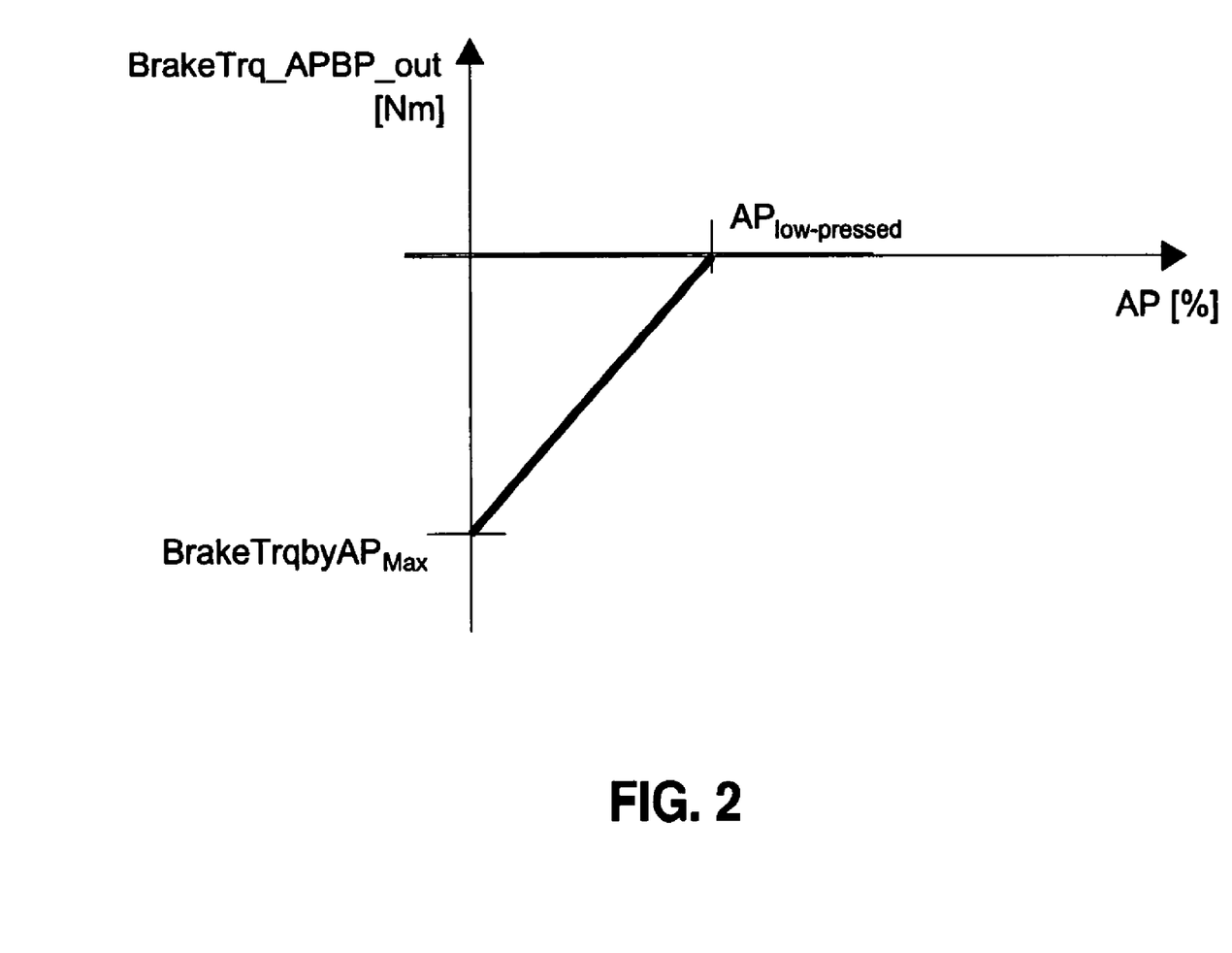
FIG. 2 shows a chart of the performance of the braking torque as a function of the position of the accelerator pedal.
Figure 31:
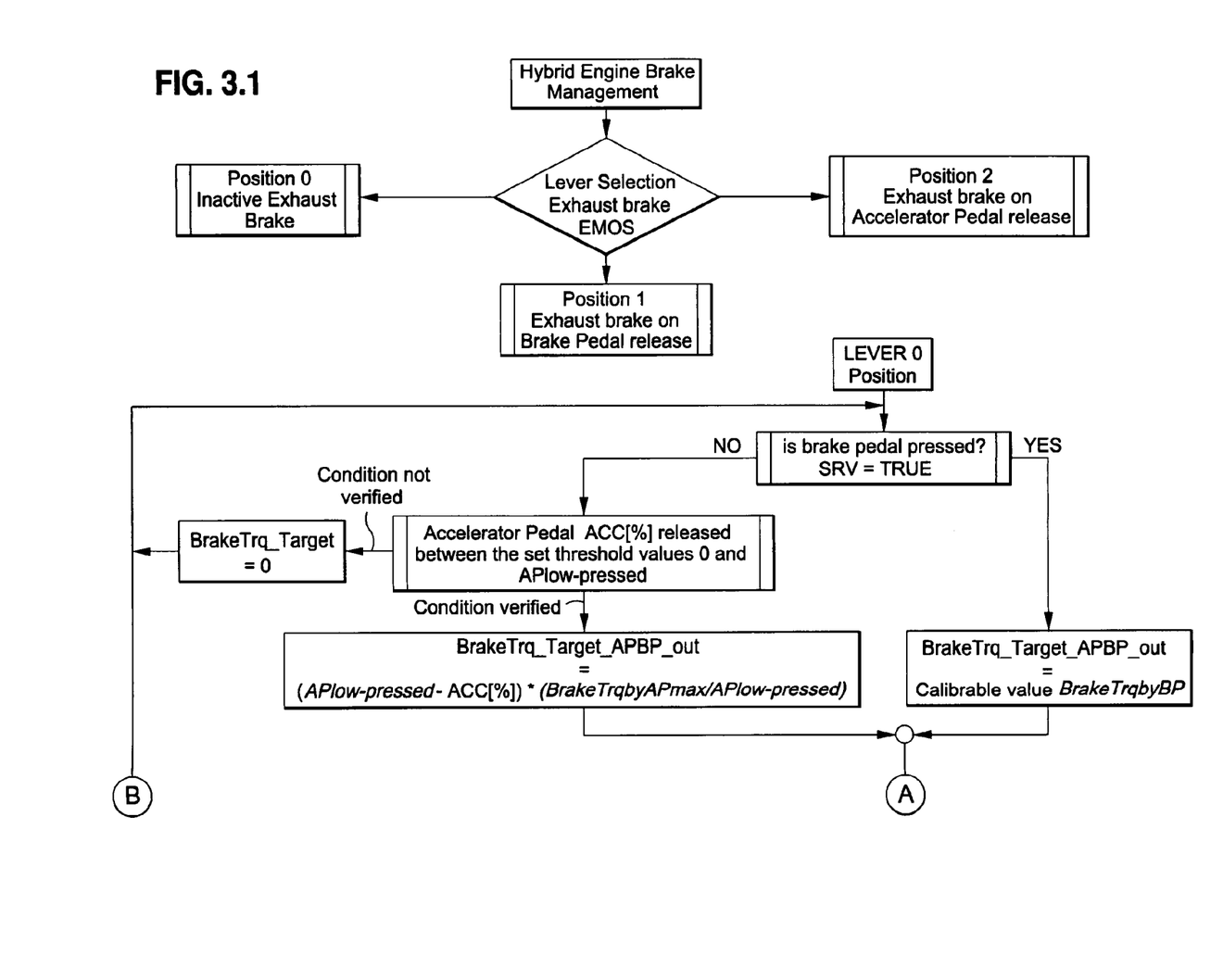
Figure 32:
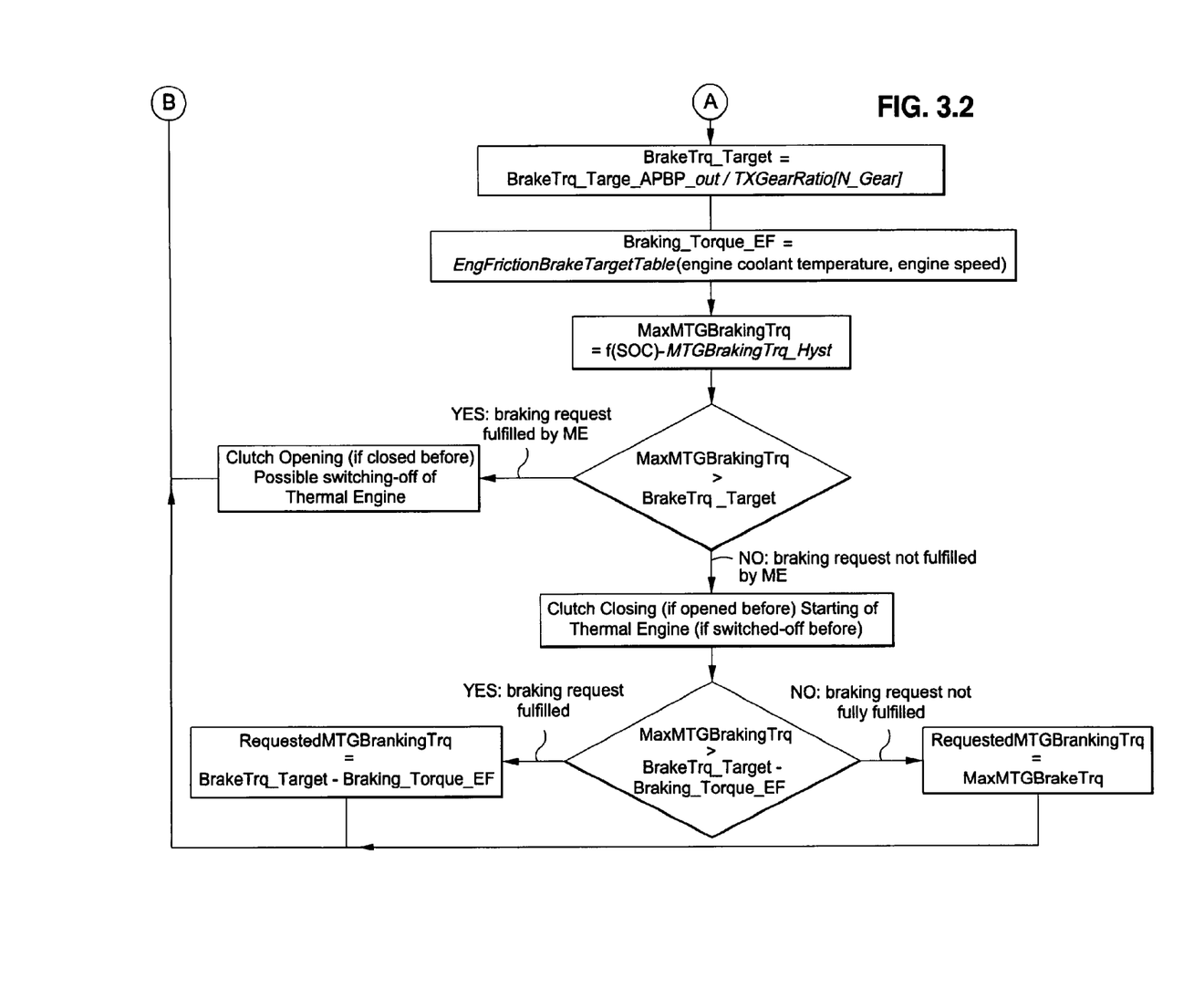
Figure 41:
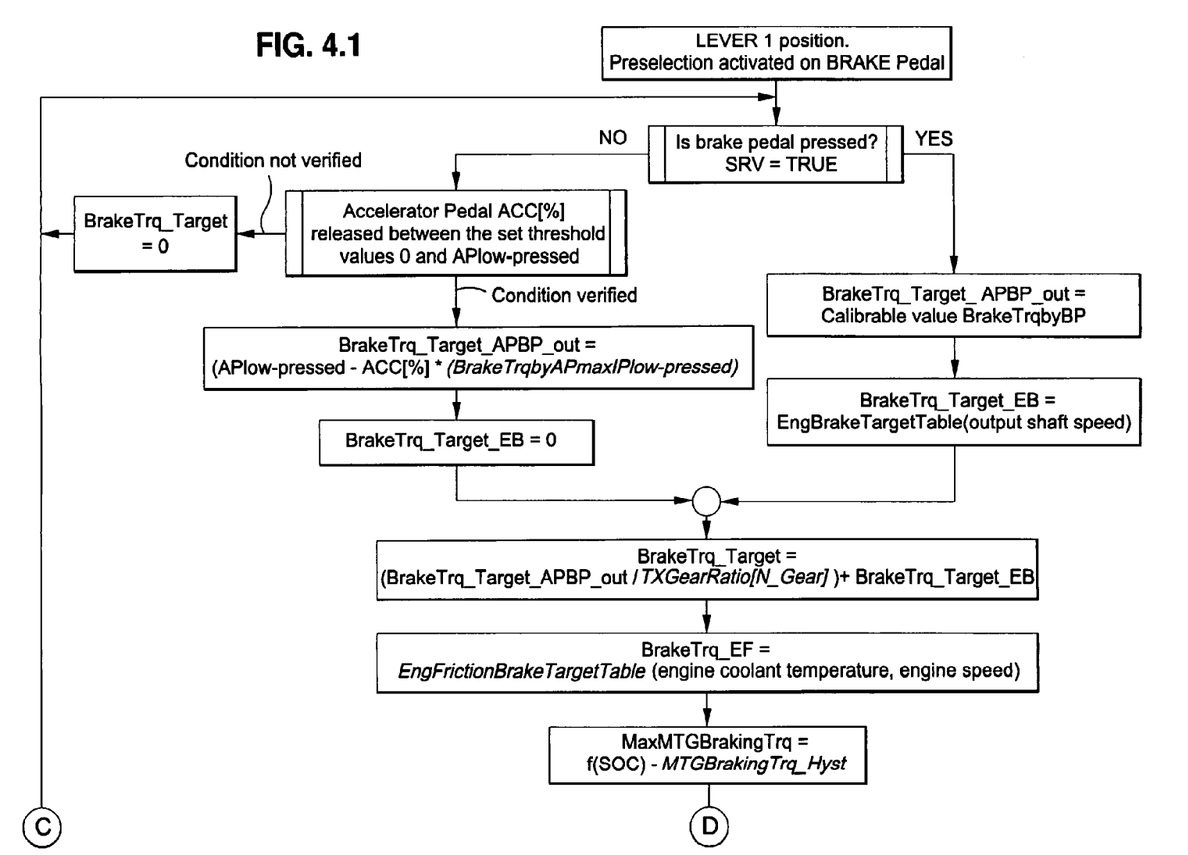
Figure 42:
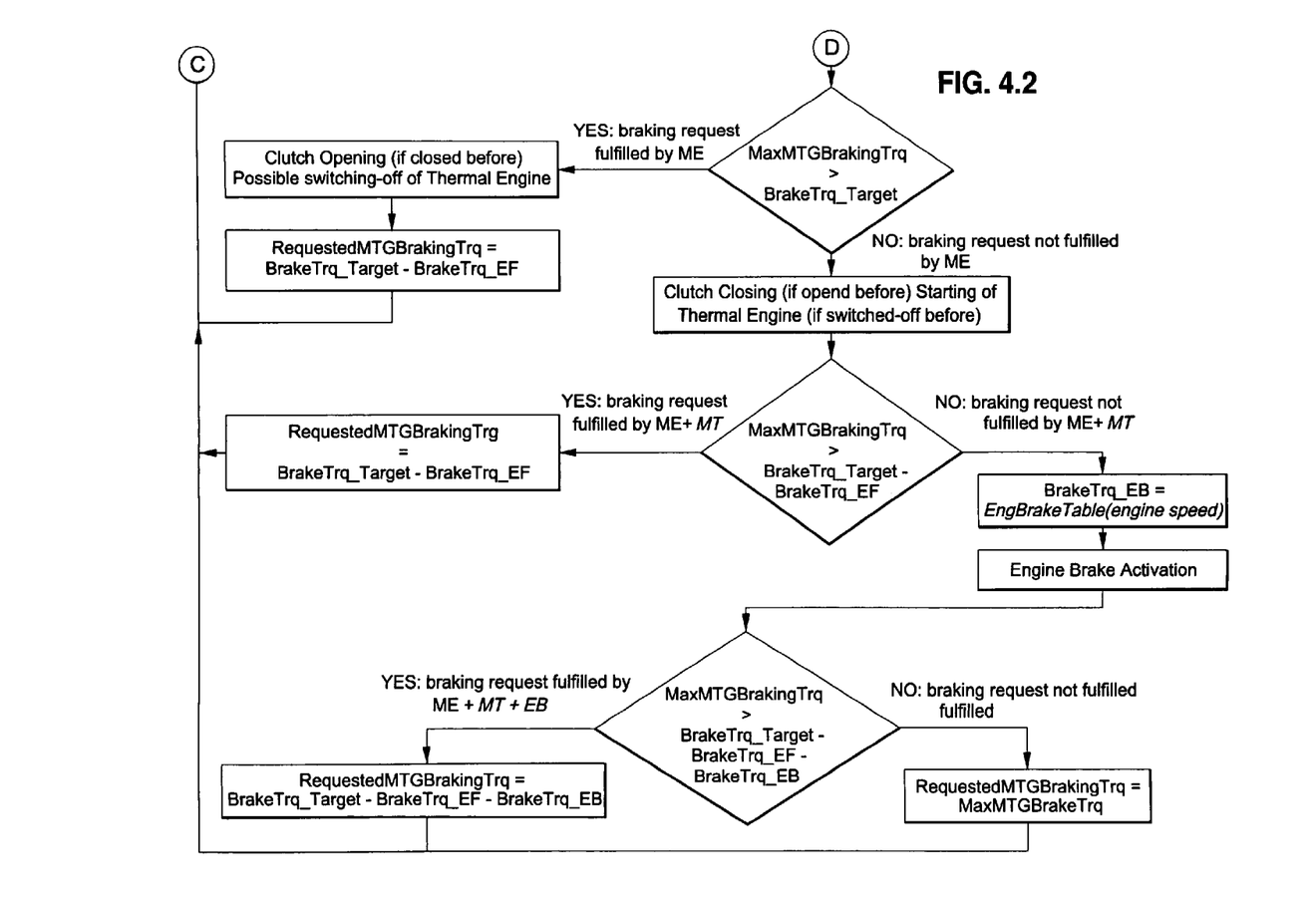
Figure 51:
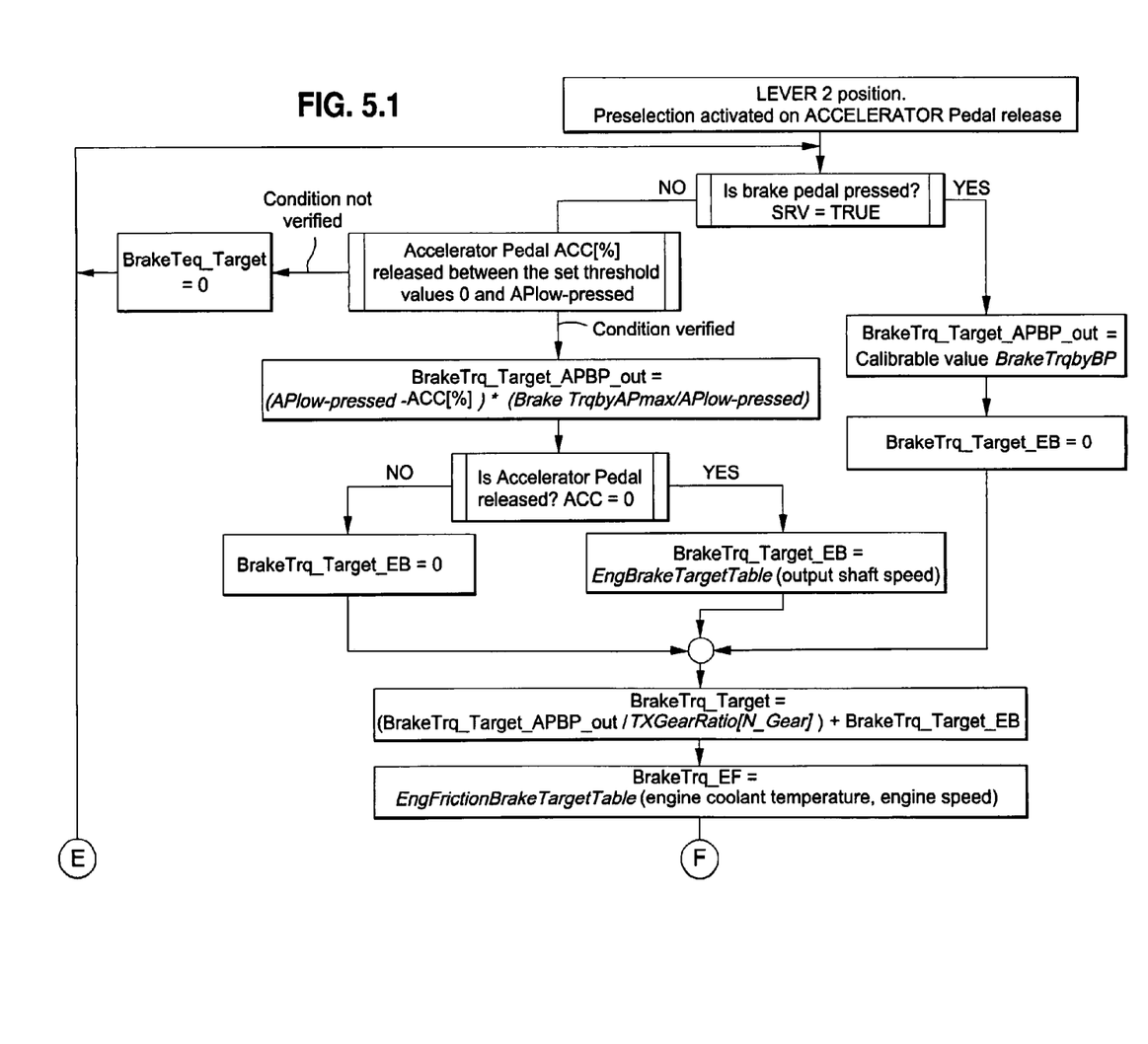
Figure 52:
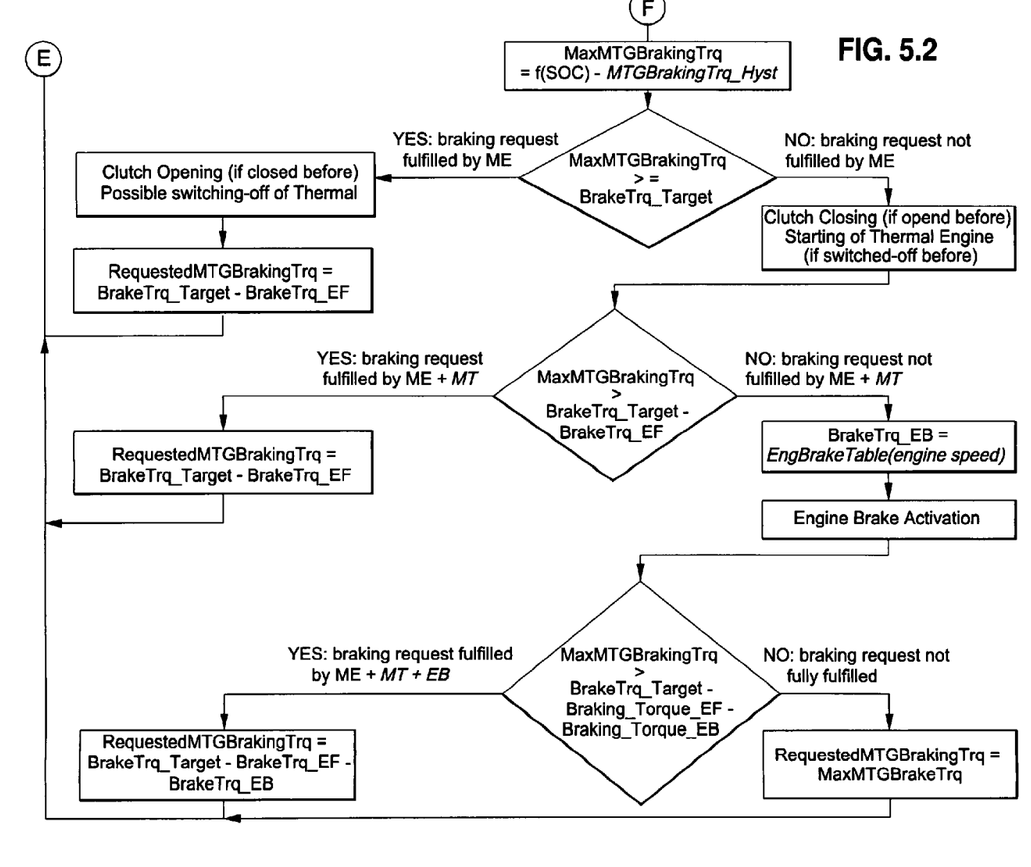

The chart in FIG. 2 shows that if the position of the accelerator pedal is between 0% and the value fixed by the calibration parameter APlow-pressed, the relation providing the torque target is the following:

$$Brake Trq\_Target\_APBP\_out = (APlow\text{-}pressed - ACC)*(Brake Trq by APMax/APlow\text{-}pressed)$$

In case the position of the accelerator pedal is higher than APlow-pressed the torque target is zero:

$$Brake Trq\_Target\_APBP\_out = 0$$

Once the torque target in transmission output TR (BrakeTrq_Target_APBP_out) is known, it has to be brought to the transmission input by means of the transmission gear ratio (TXGearRatio):

$$Brake Trq\_Target\_APBP = Brake Trq\_Target\_APBP\_out/TXGearRatio$$

Calculation of the Contribution BrakeTrq_Target_EB to the Reference of Braking Torque.

On the contrary, the contribution of the braking torque target associated to the request of the intervention of the additional braking system (BrakeTrq_Target_EB) is a function of the preselection:

If PRES=0 (deactivation of the additional engine brake), then the braking torque target is equal to:

$$Brake Trq\_Target\_EB = 0$$

If PRES=1 (preselection on brake pedal) and the brake pedal is pressed (SRV=TRUE), then the braking torque target it calculated as a function of the angular speed of the transmission output shaft (TR) and is equal to:

$$Brake Trq\_Target\_EB = Eng Brake Target Table(output\ shaft\ speed)$$

If PRES=2 (preselection on accelerator pedal) and the accelerator pedal is fully released, then the braking torque target it calculated as a function of the angular speed of the transmission output shaft (TR) and is again equal to:

$$Brake Trq\_Target\_EB = Eng Brake Target Table(output\ shaft\ speed)$$

The torque reference values of the EngBrakeTargetTable are reported in tabular form and are defined by calibration.

Actuation of the Braking Torque Reference BrakeTrq_Target.

In order to calculate the braking torque reference for the electric engine RequestedMTGBrakingTorque and therefore to actuate the overall braking torque target BrakeTrq_Target, ECU calculates the braking torque contribution associated to the internal friction of the engine (BrakeTrq_EF) and the braking torque contribution associated to the additional brake (BrakeTrq_EB), according to two tables defined by calibration and stored in ECU.

The braking torque obtained by the intervention of the additional engine brake (BrakeTrq_EB) is function only of the engine speed:

$$Brake Trq\_EB = Eng Brake Table(Engine Speed)$$

On the contrary, the braking torque obtained by the engine friction is function of engine temperature and speed:

$$Brake Trq\_EF = Eng Friction Brake Table(Eng Coolant Temperature, Engine Speed)$$

Once all the braking torque contribution are defined, ECU is able to define the braking torque target of the engine-generator.

ECU has now to estimate the value of the maximum braking torque that the engine-generator is able to deliver. This value is a function of the batteries BAT state of charge when the regenerative braking occurs, brought to ECU by means of the signal SOC.

In order to take into account the increase of the batteries BAT charge, associated to the braking step, a hysteresis term is introduced (MTGBrakingTrq_Hyst). Therefore the expression of the maximum torque (estimated) delivered by the engine-generator may be wrote as:

Max*MTG*Braking*Trq*=*f*(*SOC*)−*MTG*Braking*Trq*_Hyst

Once the maximum braking torque that the engine-generator is able to provide (MaxMTGBrakingTrq) is known, ECU compares this value to the braking torque target (BrakeTrq_Target) and determines the clutch state (closed or open). The cases that may occur are the following:

If MaxMTGBrakingTrq>BrakeTrq_Target (maximum braking torque of the engine-generator higher than the braking torque target) the braking action may be fully carried out by the engine-generator alone, without any intervention neither of the engine brake nor of the additional brake:

The control requires the opening of the clutch and possibly the switching off of the thermal engine MT, according to the Stop&Start function The control makes the whole braking torque target to be actuated by the electric engine:

Requested*MTG*BrakingTorque=Brake*Trq*_Target

When the condition of the previous point is not fulfilled, the braking torque target may not be fully obtained by means of the engine-generator, therefore the other contributions provided by the intervention of the engine brake or of the additional brake are necessary. There are three subcases:

If MaxMTGBrakingTrq>BrakeTrq_Target−BrakeTrq_EF then:

The control requires the closing of the clutch and possibly the restarting of the thermal engine MT, according to the Stop&Start function The control makes the braking torque target to be actuated by the electric engine-generator together with the engine friction:

Requested*MTG*BrakingTorque=Brake*Trq*_Target−Brake*Trq*_EF

If MaxMTGBrakingTrq>BrakeTrq_Target−BrakeTrq_EF−BrakeTrq_EB then

The control requires the closing of the clutch and possibly the restarting of the thermal engine MT, according to the Stop&Start function The control requires the activation of the additional braking system The control makes the braking torque target to be actuated by the electric engine-generator together with the additional brake and with the engine friction:

Requested*MTG*BrakingTorque=Brake*Trq*_Target−Brake*Trq*_EF−Brake*Trq*_EB

If MaxMTGBrakingTrq<BrakeTrq_Target−BrakeTrq_EF−BrakeTrq_EB then

The control requires the closing of the clutch and possibly the restarting of the thermal engine MT, according to the Stop&Start function The control requires the activation of the additional braking system The control makes the braking torque target to be actuated, as much as possible, by the electric engine-generator together with the additional brake and with the engine friction, making the electric engine-generator to deliver the maximum possible braking torque target:

Requested*MTG*BrakingTorque=Max*MTG*Brake*Trq*

In such condition the braking torque may not be carried out. In order to fulfil the torque target it is necessary that the driver intervenes and uses the service brakes.

The present invention may advantageously be carried out by means of a computer program, which comprises program code means performing one or more steps of said method, when said program is run on a computer. The program may be wrote by using the usual knowledge of the vehicular control unit programming techniques available to the person skilled in the art, who is able to embody the invention on the basis of this description. For this reason the scope of the present patent is meant to cover also said computer program and the computer-readable means that comprises a recorded message, such computer-readable means comprising the program code means for performing one or more steps of such method, when such program is run on a computer.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details.

What is claimed is:

1. Braking method with energy recovery for a vehicle equipped with hybrid traction system and service brakes, said hybrid traction system comprising:

at least a thermal engine (MT), able to provide a first braking torque (EF) deriving from engine friction and a second braking torque (EB) deriving from one or more additional braking systems, operating on the thermal engine, a transmission, or both the thermal engine and the transmission;

at least an electric engine-generator (ME), connected to one or more battery systems (BAT), able to provide a third braking torque (MTG) if functioning as a generator, wherein said braking method comprises:

a determination step of a braking torque overall value which considers said first, second and third braking torque, and which gives the priority to the contribution of said third braking torque (MTG) for the highest energy recovery wherein said determination step of a braking torque overall value comprising:

the deactivation of said thermal engine (MT), if said electric engine-generator (ME) is able to obtain said braking torque overall value by means of only said third braking torque (MTG);

the activation of said thermal engine (MT), if said electric engine-generator (ME) is not able to obtain said braking torque overall value by means of only said third braking torque (MTG), generating at least said first braking torque (EF) so that said braking torque overall value comprises said first and third braking torque;

the activation of said additional braking system operating on the thermal engine or on the transmission, so that said additional braking system is able to generate also said second braking torque (EB), so that said braking torque overall value comprises said first, second and third braking torque; and an activation or deactivation step of the contribution given from said second braking torque (EB) according to a preselection (PRES) of three options:
- first option (0): additional braking system deactivated;
- second option (1): additional braking system activated by the pressure on the service brake pedal;
- third option (2): additional braking system activated by the release of the service brake pedal.

2. Braking method with energy recovery, according to claim 1, wherein said determination step of a braking torque overall value comprises the determination of a first contribution EB so that:
- if said preselection (PRES) is set on the first option (0), the first, contribution EB is zero;
- if said preselection (PRES) is set on the second option (1) and the brake pedal is pressed, or if it is set on the third option (2) and the accelerator pedal is released, the first contribution EB takes a value defined on the basis of a first table of values (EngBrakeTargetTable) and of the angular speed of the transmission output shaft (TR).

3. Braking method with energy recovery, according to claim 2, wherein said determination step of a braking torque overall value comprises the determination of a contribution APBP so that:
- if the brake pedal is pressed, the second contribution APBP is given by a first predetermined value:

$$BrakeTrq\_Target\_APBP\_out = BrakeTrqbyBP$$

- if the position of the accelerator pedal ACC is comprised between 0% and a calibration value APlow-pressed, the second contribution APBP is given by:

$$BrakeTrq\_Target\_APBP\_out = (APlow\text{-}pressed - ACC)*(BrakeTrqbyAPMax)/APlow\text{-}pressed$$

wherein ACC expresses the position of the accelerator pedal and BrakeTrqbyAPMax is a second predetermined value;
- if the position of the accelerator pedal ACC is higher that APlow-pressed and the brake pedal is not pressed, the second contribution APBP is zero.

4. Braking method with energy recovery, according to claim 1, wherein said determination step of a braking torque overall value comprises the determination of a contribution given by said first braking torque (EF) defined on the basis of a second table of values, whose values depend on the characteristics of the thermal engine (MT) and of mounted accessories.

5. Braking method with energy recovery, according to claim 1, wherein said determination step of a braking torque overall value comprises the determination of the possible contribution obtainable by said second braking torque (EB), calculated on the basis of a third table of values (EngBrakeTable).

6. Braking method with energy recovery, according to claim 1, wherein said determination step of a braking torque overall value comprises the following steps of:
- determining a maximum torque value (MaxMTGBrakingTrq) which said engine-generator (ME) is able to generate, function of the state of charge of said battery system (BAT);
- comparing said maximum torque value (MaxMTGBrakingTrq) with said braking torque overall value (BrakeTrq_Target):
  - if MaxMTGBrakingTrq>BrakeTrq_Target, then the clutch is opened or however the additional braking system is deactivated, and said braking torque overall value (BrakeTrq_Target) is equal to said third braking torque (MTG);
  - if MaxMTGBrakingTrq>(BrakeTrq_Target−EF−EB), then the clutch is closed or however the additional braking system is activated, and said braking torque overall value (BrakeTrq_Target) is given by the contribution of said first, second and third braking torque:
  - if MaxMTGBrakingTrq<(BrakeTrq_Target−EF−EB), then the clutch is closed or however the additional braking system is activated, and said braking torque overall value (BrakeTrq_Target) is given by the contribution of said first, second and third braking torque together with the contribution given by said service brake.

7. Braking device with energy recovery for a vehicle equipped with hybrid traction system and service brakes, said hybrid traction system comprising:
- at least a thermal engine (MT), able to provide a first braking torque (EF) given by engine friction and a second braking torque (EB) given by one or more additional braking systems operating on the thermal engine, the transmission, or both the thermal engine and the transmission,
- at least an electric engine-generator (ME), connected to a traction battery system (BAT), able to provide a third braking torque (MTG) if functioning as a generator,
- wherein said braking device comprises at least an electronic control unit (ECU) suitable to perform a braking method with energy recovery comprising:
  - a determination step of a braking torque overall value which considers said first, second and third braking torque, and which gives the priority to the contribution of said third braking torque (MTG) for the highest energy recovery wherein said determination step of a braking torque overall value comprising:
    - the deactivation of said thermal engine (MT), if said electric engine-generator (ME) is able to obtain said braking torque overall value by means of only said third braking torque (MTG);
    - the activation of said thermal engine (MT), if said electric engine-generator (ME) is not able to obtain said braking torque overall value by means of only said third braking torque (MTG), generating at least said first braking torque (EF) so that said braking torque overall value comprises said first and third braking torque;
    - the activation of said additional braking system operating on the thermal engine or on the transmission, so that said additional braking system is able to generate also said second braking torque (EB), so that said braking torque overall value comprises said first, second and third braking torque; and
  - an activation or deactivation step of the contribution given from said second braking torque (EB) according to a preselection (PRES) of three options:
    - first option (0): additional braking system deactivated;
    - second option (1): additional braking system activated by the pressure on the service brake pedal:
    - third option (2): additional braking system activated by the release of the service brake pedal.

8. Braking device with energy recovery according to claim 7, wherein said additional braking system, operating on the thermal, engine, or on a transmission is of the type Exhaust Engine Brake, Decompression Brake, combined, or Intarder/Retarder.

* * * * *